United States Patent [19]
Beakes et al.

[11] Patent Number: 5,340,043
[45] Date of Patent: Aug. 23, 1994

[54] STATOR WINDING APPARATUS INCLUDING WINDING FORM ASSEMBLIES

[75] Inventors: John M. Beakes, Fairborn; Lawrence E. Newman, Tipp City, both of Ohio

[73] Assignee: Globe Products Inc., Huber Heights, Ohio

[21] Appl. No.: 899,428

[22] Filed: Jun. 16, 1992

[51] Int. Cl.$^5$ .................. B65H 81/06; B25G 3/18; H02K 15/14

[52] U.S. Cl. .................. 242/1.1 R; 403/325; 29/596

[58] Field of Search .............. 242/1.1 R, 1.1 E, 1.1 A; 29/596; 403/325, 326, 327, 321, 322

[56] References Cited

U.S. PATENT DOCUMENTS

| | | | |
|---|---|---|---|
| Re. 25,281 | 11/1962 | Moore | 242/1.1 R |
| 1,741,969 | 12/1929 | Bellows | 403/344 |
| 2,810,848 | 10/1957 | Roberts | 242/1.1 E |
| 2,923,484 | 2/1960 | Roberts | 242/1.1 E |
| 3,281,084 | 10/1966 | Lill | 242/1.1 E |
| 3,331,562 | 7/1967 | Beushausen | 242/1.1 E |
| 3,464,639 | 9/1969 | Harelson et al. | 242/1.1 R |
| 3,648,938 | 3/1972 | Dryburgh | 242/1.1 E |
| 3,812,570 | 5/1974 | Mason | 242/1.1 R X |
| 3,982,842 | 9/1976 | Denman | 403/325 X |
| 4,158,314 | 6/1979 | Finegold | 242/1.1 R X |
| 4,679,312 | 7/1987 | Nussbaumer et al. | 242/1.1 R |
| 4,732,338 | 3/1988 | Eminger et al. | 242/1.1 R |
| 4,762,283 | 8/1988 | Luciani | 242/1.1 R |
| 4,982,908 | 1/1991 | Luciani | 242/1.1 R |
| 5,186,405 | 2/1993 | Beakes et al. | 242/1.1 R |
| 5,197,685 | 3/1993 | Banner | 242/1.1 R |

FOREIGN PATENT DOCUMENTS 779417 7/1957 United Kingdom ............ 242/1.1 A

OTHER PUBLICATIONS

Disclosure of Winding Forms Manipulated by Carriages Prepared for Purposes of Information Disclosure Statement Admitted to be Prior Art 6 pages. "New Concepts" article Techevents published by Globe Products Inc., Mar. 1992, pp. 6 and 7; cover page and p. 12 also included.

*Primary Examiner*—Daniel P. Stodola
*Assistant Examiner*—Michael R. Mansen
*Attorney, Agent, or Firm*—Roger S. Dybvig

[57] ABSTRACT

A stator winding machine is provided with a male winding form having a pair of connecting rods and a female winding form having sockets that slidably receive the connecting rods. The winding forms are handled by manipulation of winding form carriages and are clamped to one another and to the stator by a clamp mechanism integrated into the female winding form that grips the male connecting rods. Each clamp mechanism comprises a movable clamp member biased into engagement with the male connecting rods and a movable release member confined within the female winding form. The release member is partly in the path of a conventional carriage-mounted winding form-support pin at the time it enters the female winding form so that the release member is moved by such support pin in a direction to cause it to move the movable clamp member away from the male connecting rods and thereby relieve clamping pressure. In one embodiment, the release member is a pivotal lever confined within the female winding form. In a second embodiment, the release member is a sliding link confined within the female winding form.

14 Claims, 3 Drawing Sheets

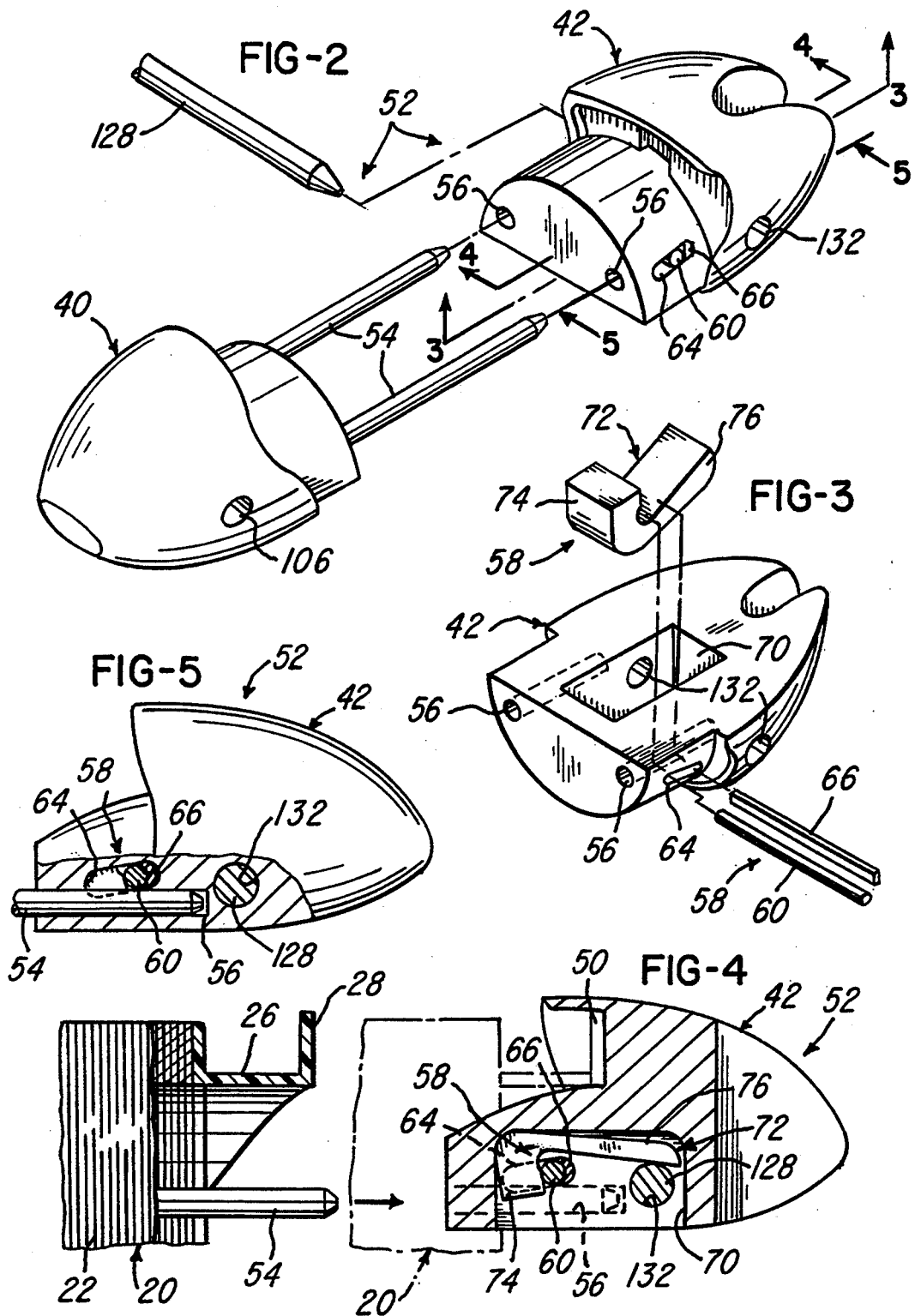

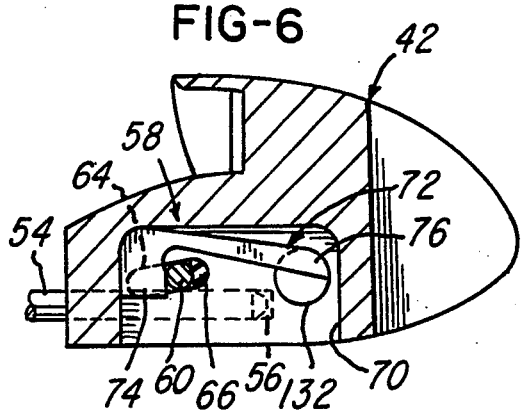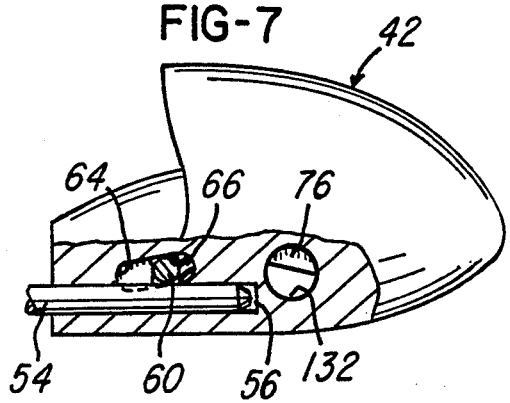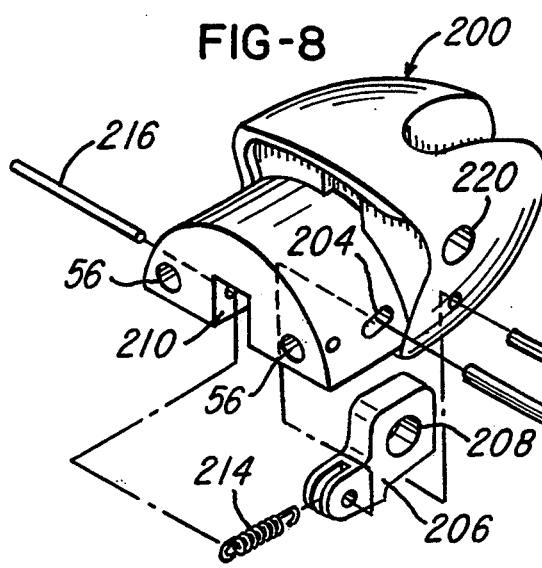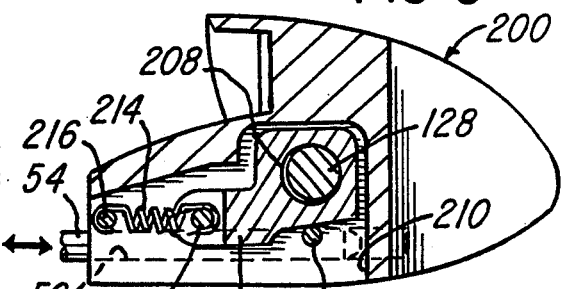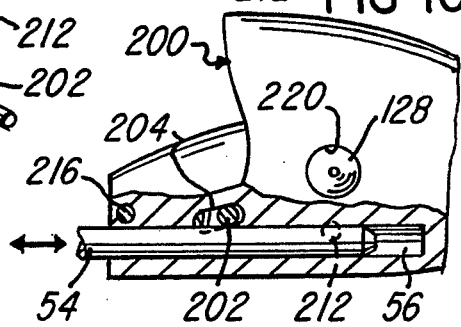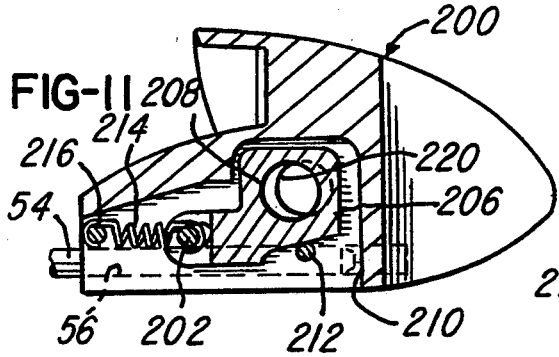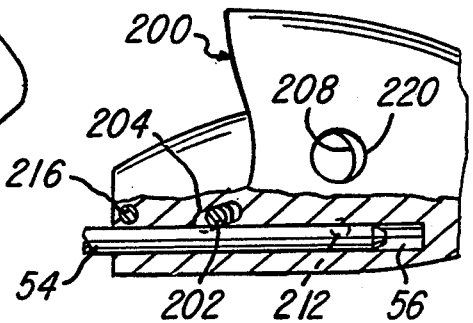

STATOR WINDING APPARATUS INCLUDING WINDING FORM ASSEMBLIES

SUMMARY OF THE INVENTION

This invention relates to an apparatus for winding stators for dynamoelectric devices and, although not so limited, especially to a method and apparatus for winding two pole stators.

This invention is primarily intended for winding stators of the type having coil support extensions connected to the pole pieces and extending from both end faces of the stator for the purpose of supporting the stator coil end turns, the coil support extensions having outwardly directed coil-retaining fingers spaced from the end faces of the stator core.

This invention is intended for use with well known methods and apparatus for winding stators wherein coils of wire drawn from sources of wire under tension are wound around the pole pieces by a reciprocating and oscillating winding head or ram. The winding head or ram is driven by a mechanism such as that shown in U.S. Pat. No. 4,158,314. A common practice when winding two pole stators in this fashion is to use two pairs of oppositely directed shrouds or winding forms, one pair for each pole, that guide the wire segments exiting from the winding head around the pole pieces. The shrouds or winding forms are usually secured to the stator by pairs of form-retaining clamps or blades but it has been recognized that there are disadvantages to the use of the form retaining blades. The manipulations required to operate the blades or clamps are time-consuming and significantly limit production speeds. In addition, space for insertion of the blades must necessarily be provided by a gap between the end faces of the stator core and the coil end turns, a factor which can have a negative effect upon the characteristics of the wound coils.

A primary object of this invention is to provide an apparatus for winding a two pole stator utilizing shrouds or winding forms which may be rapidly and securely assembled onto a stator core and rapidly disassembled from the stator core. A related object of this invention is to provide apparatus that do not require the use of form retaining blades. A further object of this invention is to provide a method and apparatus wherein the steps of assembly and disassembly of the winding forms on the stator cores are accomplished automatically.

The foregoing objects are also included in the objects stated in a copending patent application of Alvin C. Banner, Ser. No. 07/648,172, filed Jan. 30, 1991, now U.S. Pat. No. 5,197,685, granted Mar. 30, 1993. As disclosed in the Banner '172 application, two pairs of winding forms are mounted on the coil support extensions and have surfaces engaging the outermost surfaces of the coil retaining fingers thereon so that the winding forms are prevented from moving radially inwardly of the stator core. Each pair of winding forms has a latch mechanism interconnecting them, and a spring coacting between one of the winding forms and the latch mechanism biases the winding forms against the coil support extensions. The Banner '172 latch mechanisms, of which two embodiments are shown in the Banner '172 application, each comprises a latch lever rotatably connected to one of the winding forms and extending toward the opposed winding form on the opposite end of the stator. The latch lever terminates in a free end adjacent the opposed winding form and has a latching flange extending generally perpendicularly from the free end. A latch retaining member is slidably mounted on the opposed winding form. The latch retaining member has a latch hook positioned to be engaged with and disengaged from the latching flange by rotation of the latch lever.

As further disclosed in the Banner '172 application, a pair of winding form carriages are provided, as is conventional, for supporting the winding forms and moving them toward and away from stators located in position to receive them. In contrast to previous conventional practice, the Banner '172 carriages are not only provided with support pins for supporting the winding forms but also with additional means for manipulating the latch mechanisms.

In order for the interlocking parts of the latch mechanisms disclosed in the Banner '172 application to be properly engaged with one another, the separation between the winding forms must be uniform within narrow tolerances. This means that the stack heights of the lamination forming the stators must be substantially uniform. In many cases, there is a need in industry for the ability to manufacture stators having different stack heights, and a further object of this invention is to provide a form clamping method and apparatus which enable the use of the same pair of cooperating winding forms for winding stators having significantly different stack heights.

A feature of a latching mechanism disclosed in the Banner '172 application is that a spring biases the winding forms against the stator coil support extensions. This creates the possibility that the outward pressures exerted on a pair of winding forms as the winding of coils progresses may overcome the bias of the spring and increase, at least slightly, the separation between the winding forms. Although such increase may not always be harmful, an object of this invention is to provide a method and apparatus by which the winding forms are clamped to the stator assembly with clamping pressures created by operation of the winding form carriages, and such pressures are maintained by rigidly clamping the winding forms to one another. This makes it possible to better control the coil winding process and the shapes of the coils formed thereby.

Another object of this invention is to provide an improvement upon the Banner '172 invention in which the winding form clamps operate automatically in response to the movements of the winding form support pins into and out of the winding forms to appropriately clamp or unclamp the winding forms so that the winding form carriages need not be provided with additional means for manipulating the clamping mechanisms. Accordingly, it is possible, using the teachings of this invention, to simplify the construction of new machines and to retrofit machines already in use to take advantage of this invention without modification of the winding form carriages.

A further object of this invention is to provide winding forms with clamp mechanisms which are simple and rugged, as required for the mass production of stators, and which may be used in new machines or easily used to retrofit existing stator winding machines having conventional winding form carriages so that the form retaining mechanisms of the conventional winding machines need not be used, thereby saving a portion of the time taken to complete the winding of each stator. More specifically, an object is to provide winding forms which may be moved to, and clamped together in pressing engagement with, an unwound stator assembly in preparation for the winding of coils, which will firmly grip the stator assembly during the winding of coils on the pole pieces of the stator assembly, and which may thereafter be unclamped from one another and removed from the wound stator assembly entirely with the use of conventional winding form carriages which are not equipped with mechanisms for clamping or unclamping the winding forms. The winding form clamps are preferably located within one of each pair of cooperating winding forms and, therefore, do not interfere with or obstruct any of the stator winding or handling procedures. A retrofit may be accomplished by simply changing one of each pair of winding forms and appropriately modifying the machine control circuitry as required to disable the form retaining blades.

In accordance with this invention, a stator is placed into the winding position. The standard winding form handling mechanism, which has carriage-mounted support pins protruding into the winding forms, moves the winding forms into position on the stator to be wound. After placement of the winding forms into proper position, the support pins are removed from the winding forms and backed out of the way for subsequent winding operations. Automatic clamp mechanisms inside one of each pair of cooperating winding forms lock them together and to the stator assembly as the support pins are being removed. After winding, the support pins are again inserted into the winding forms, the form clamps automatically unlocked, and the forms removed from the winding area. The next stator is then moved into the winding station. Form clamping and form unclamping are caused by, and occur during, movements of the support pins into and out of the forms and do not require any machine cycle time separate from the cycle time taken for the carriages to manipulate the winding forms.

As conventional, the winding forms comprise a male winding form having a pair of connecting rods and a female winding form having sockets that slidably receive the connecting rods when the winding forms are assembled together. However, a clamp mechanism is integrated into the female winding form that comprises a movable clamp member, means for guiding the movable clamp member toward and away from the portions of the male connecting rods extending into the female sockets when the winding forms are assembled onto a stator, and means for biasing the clamp member into engagement with the connecting rods. A movable release member is confined within the female winding form for moving the clamp member to relieve the clamping pressure on the connecting rods. The release member is partly in the path of the carriage-mounted winding form-support pin which enters the female winding form so that the release member is moved by such support pin in a direction to cause it to move the movable clamp member away from the male connecting rods and thereby relieve clamping pressure thereon. The winding form carriages can then be manipulated to remove the winding forms from one another and from the wound stator.

Two embodiments of clamp mechanisms are disclosed, one in which the release member comprises a pivotal lever confined within the female winding form and the other in which the release member comprises a sliding link confined within the winding form.

Other objects and advantages will become apparent from the following description of the drawings.

BRIEF DESCRIPTION OF THE DRAWINGS

FIG. 1 also diagrammatically illustrates the movements of the carriages.

FIG. 2 is an exploded perspective view of the upper pair of winding forms of FIG. 1 and a fragment of a winding form support pin that forms part of one of the winding form carriages.

FIG. 3 is an exploded perspective view of one of the upper pair of winding forms as viewed generally from below, as indicated by the sight line 3—3 of FIG. 2.

FIG. 4 is a cross-sectional view, taken along line 4—4 of FIG. 2, of the winding form illustrated in FIG. 3 and shows, in cross section, the winding form support pin of FIG. 2 operatively associated therewith. FIG. 4 also includes a fragmentary side elevational view, partly in cross section, of a stator to be wound and a connecting rod portion of the opposite winding form, and diagrammatically illustrates the relative movement that occurs to assemble the winding forms onto the stator.

FIG. 5 is a side elevational view of the winding form of FIG. 3 and also shows a fragment of the opposite connecting rod. A portion of FIG. 5 is a cross-sectional view generally taken along the line 5—5 of FIG. 2. At the point in time represented in FIG. 5, the winding forms are assembled to the stator but are not clamped together. The stator is not illustrated in FIG. 5 or in FIGS. 6 through 12 described below in order to avoid a confusion of lines.

FIGS. 6 and 7 are views similar to FIGS. 4 and 5, respectively, of the same winding form and a fragment of the connecting rod of the opposite winding form shown at a time when the winding forms are clamped together.

FIG. 8 is an exploded perspective view of a second embodiment of winding form in accordance with this invention.

FIGS. 9 and 10 are views similar to FIGS. 6 and 7 but illustrate the embodiment of FIG. 8 at a time when that winding form and the opposite winding form are assembled together but not clamped together.

FIGS. 11 and 12 are views of the second embodiment and are similar to FIGS. 9 and 10, respectively, but illustrate the embodiment of FIG. 8 at a time when that winding form and the opposite winding form are clamped together.

DETAILED DESCRIPTION

Figure 1:
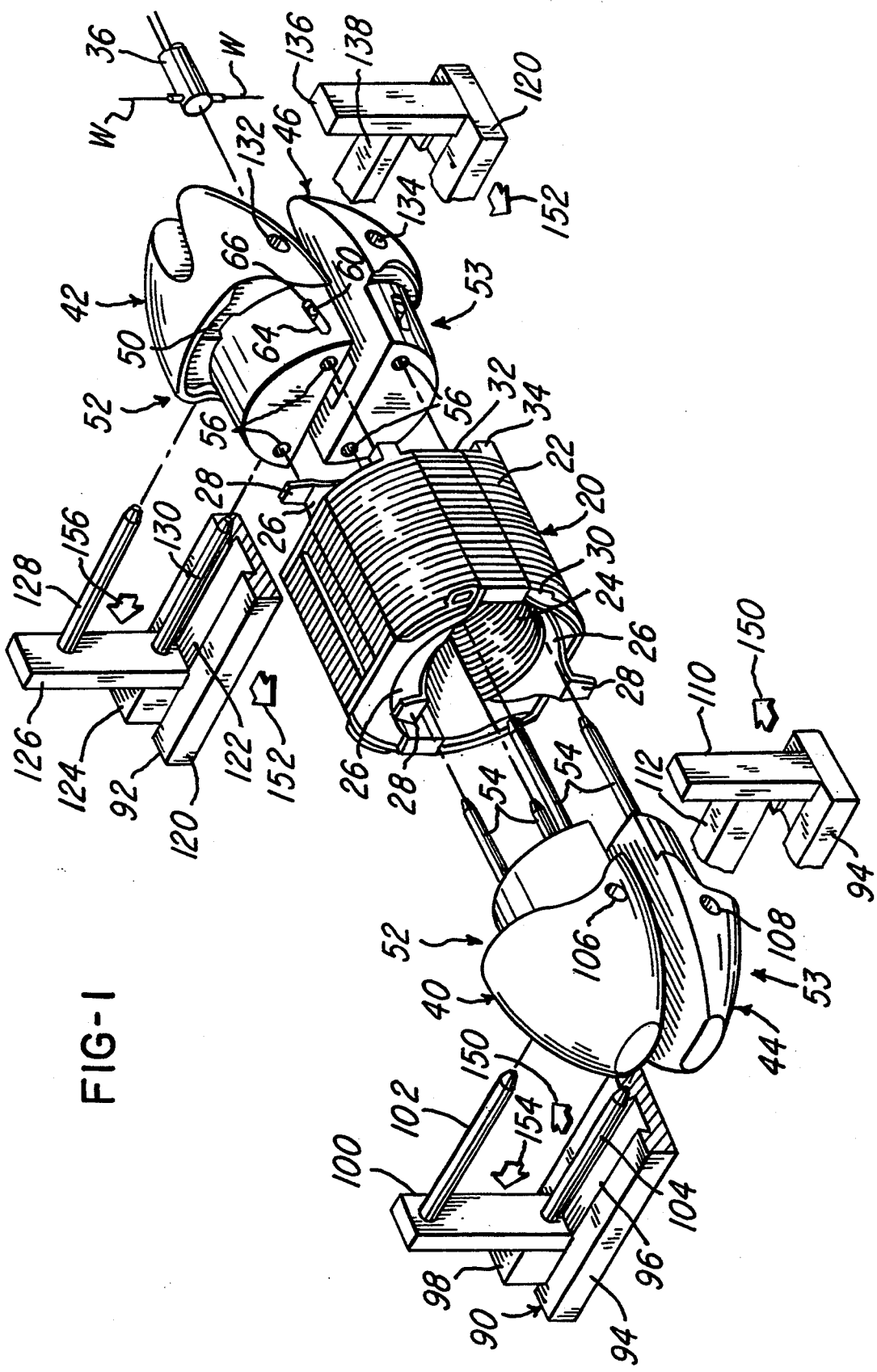
FIG. 1 is an exploded perspective view of a stator to be wound, a fragment of a winding head used to wind coils on the stator, and upper and lower pairs of winding forms in accordance with one embodiment of this invention. In addition, FIG. 1 includes a fragmentary perspective view of portions of carriages for supporting and positioning the winding forms.

With reference to FIG. 1, this invention relates to a stator winding method and apparatus for winding a two pole stator, generally designated 20, for a dynamoelectric device. Stator 20 includes a substantially hollow, generally cylindrical laminated core 22 formed with a pair of longitudinally-extending, diametrically opposed, pole pieces 24. As is now a common practice, both ends of both pole pieces 24 are provided with longitudinally-extending coil support extensions 26 for supporting the end turns of the stator coils. Coil retaining fingers 28 project generally radially outwardly from the free ends of the coil support extensions 26, i.e. the ends most remote from the end faces of the stator core 22. Stator 20 additionally comprises a plastic end plate 30 covering the left end face of the core 22 (as viewed in FIG. 1) and the opposite end face is covered by another plastic end plate or terminal board 32 having sockets 34 for terminal posts (not shown), the construction of which is unimportant for purposes of this invention. The coil support extensions 26 are typically integrally formed with the plastic end plates.

Coils of wire (not shown) are wound on the pole pieces 24 by means of a winding head or ram 36, shown in greatly simplified form in FIG. 1, that draws two wires W from sources of wire under tension (not shown) and reciprocates through the bore of the stator 20 and oscillates at each end of each reciprocating stroke, as well known, to wind two coils simultaneously, one around each pole piece 24. The ram 36 may be driven by the mechanism shown in U.S. Pat. No. 4,158,314, or by any one of several other mechanisms that have been developed for this purpose.

As is also well known, at the beginning of the winding operations, the free ends of the wires W are gripped by wire clamps (not shown) near the stator 20 and, after the coils are wound, the wire segments leading from the wound coils may be temporarily clamped by other clamps (not shown) in fixed relation to the stator 20 and thereafter connected to terminal posts positioned in the sockets 34. The manner in which the wires are handled may be entirely conventional and forms no part of this invention, and is therefore not illustrated or further described herein.

There are four wire-guiding shrouds or winding forms shown in FIG. 1, namely a pair of upper winding forms 40 and 42 and a pair of lower winding forms 44 and 46. Here it may be noted that terms such as upper and lower, left and right, and the like, are used in a relative sense and not in an absolute sense herein. For example, the stator 20 is shown in FIG. 1 as if its longitudinal axis is essentially horizontal but it could be vertical or at some other angle relative to horizontal.

As taught in the aforementioned Banner '172 patent application, the shrouds or winding forms 40, 42, 44 and 46 are secured to the stator core 20 without the use of the usual form-retaining clamps or blades. For this purpose, the winding forms 40, 42, 44, and 46 are mounted on the coil support extensions 26 and have centrally located recesses or pockets 50 facing the stator core 22 that, when the winding forms are assembled on the stator core 22, receive the coil retaining fingers 28. The engagement of the coil retaining fingers 28 within the recesses or pockets 50 prevents the winding forms from accidentally moving radially inwardly of the stator core 22.

With reference to FIGS. 2 through 5, the upper pair of winding forms 40 and 42, when assembled on the stator 20, are interfit and clamped together to form an upper winding form assembly, generally designated 52. The lower pair of winding forms 44 and 46, shown only in FIG. 1, also form a lower winding form assembly, generally designated 53, which is an exact mirror image of the upper winding form assembly 52, as will readily be understood by those familiar with the art. Accordingly, only the upper winding form assembly 52 is further illustrated and described herein. In the remainder of this text, parts of the lower winding form assembly 53 that functionally correspond to parts of the upper winding form assembly 52 described hereafter are identified by the same reference numerals.

The left side upper winding form 40 is a male member having a pair of elongate alignment pins or rods 54 adapted to extend through the stator bore and the upper right side winding form 42 is a female member having a pair of sockets 56 for slidably receiving the free ends of the rods 54. The diameters of the sockets 56 are only slightly (on the order of 0.001 inch) greater than the connecting rods 54 so that there is a close fit between them. The winding forms are preferably made of hardened steel, as is conventional in the art.

In addition to being interfit by the rods 54 and the sockets 56, the assembled upper winding forms 40 and 42 are, during the winding of coils onto the stator pole pieces, clamped to the stator coil support extensions 26 and to one another by a clamp assembly, generally designated 58, integrated into the female winding form 42. With reference to FIGS. 2 through 7, the clamp assembly 58 comprises a clamp member or rod 60 that extends transversely through the female winding form 42 with its ends located within a pair of mutually aligned, sloping, ovate slots 64 in the female winding form 42. Bias means, which can comprise a resilient strip 66, such as polyurethane rubber, behind the clamp member 60 and trapped so as to be slightly compressed in the upper, rearward ends of the ovate slots 64, biases the clamp member 60 downwardly and forwardly (toward the stator) so that it frictionally engages and firmly grips or wedge-locks against the portions of the connecting rods 54 that extend into the sockets 56 in the female winding form 42. The connecting rods 54 are thereby clamped between the clamp rod 60 and the lower surfaces of the sockets 56.

As a matter of interest, it may be observed that the clamp assembly 58 functions as a one way clutch so that the connecting rods 54 moving into the sockets 56 would tend to move the clamping bar 60 upwardly and rearwardly out of clamping engagement therewith so that some engagement of the clamp rod 60 with the connecting rods 54 would not prevent the connecting rods 54 from being inserted more fully into the sockets 56. On the other hand, any effort to remove the connecting rods 54 from the sockets 56 would be strongly resisted because such effort will tend to pull the clamp bar 60 down the slope of the ovate slots 64 and increase the clamping pressure exerted on the connecting rods 54. In fact, the bias provided by the rubber strip 66 can be relatively weak because of the wedging effect resulting from the tendency of the clamp bar 60 to move down the inclined plane of the ovate slots 64 if any effort is made to remove the connecting rods 54 from the sockets 56.

The clamp rod 60 and the rubber biasing strip 66 extend through a cavity 70 located centrally within the female winding form 42 in which a clamp release member 72 is housed. The release member 72, which is confined by the walls of the cavity 70 and by the clamp rod 60, is shaped as a crooked or L-shaped finger or lever and has a shorter arm 74 which engages the clamp rod 60 and a longer arm 76 which, as shown in FIG. 6, extends rearwardly of the cavity 70 so that a portion of the longer arm 76 is aligned with a pair of bores 132 that are adapted to receive a carriage support pin 128 described below. The upper surface of the release member 72 at the junction of its two arms 74 and 76 pivots with a rocking motion against inside surfaces of the female winding form 42 that define the upper, forward end of the cavity 70. This enables the release member 72 to be pivoted so that it moves the clamp member 60 upwardly and rearwardly away from the connecting rods 54 as will be discussed below.

FIG. 1 illustrates a pair of winding form carriages, namely a male winding form carriage 90 and a female winding form carriage 92. Carriages 90 and 92 are used to assemble and disassemble the winding forms 40, 42, 44 and 46 and the stator 20. In practice, an unwound stator 20 would be held by a track (not shown) or other apparatus, such as a turret (not shown), in position to receive the winding forms 40, 42, 44 and 46 at a form-loading station represented in FIG. 1. The form-loading station would also be the winding station if the winding took place at that station—as is suggested by the illustration of the ram 36 in FIG. 1. However, assembly of the forms and the stator could take place either at the winding station or at another station, such as a stator load/unload station.

Male form support carriage 90 includes a slide track 94 with a dovetail groove 96 that receives a slide 98 which carries a vertical support bracket 100 from which project a pair of horizontal form support pins 102 and 104 adapted to enter, respectively, through bores 106 and 108 in the left side, or male, upper and lower winding forms 40 and 44. A vertical stop plate 110 is mounted on the near end (as viewed in FIG. 1) of the slide track 94 and carries a spacer 112 that, when the slide track 94 is appropriately positioned relative to the male winding forms 40 and 44, enters the gap between them. Spacer 112 cooperates with the form support pins 102 and 104 to maintain the relative positions of the male winding forms 40 and 44 so that their connecting rods 54 remain horizontally oriented when they are not interengaged with the female forms 42 and 46.

Female form carriage 92 includes a slide track 120 with a dovetail groove 122 that receives a slide 124 which carries a vertical support bracket 126 from which project a pair of horizontal female form support pins 128 and 130 adapted to enter, respectively, through bores 132 and 134 in the right side, or female, upper and lower winding forms 42 and 46. A vertical stop plate 136 is mounted on the near end (as viewed in FIG. 1) of the slide track 120 and carries a spacer 138 that, when the slide track 120 is appropriately positioned relative to the female winding forms 42 and 46, enters the gap between them. Spacer 138 cooperates with the form support pins 128 and 130 to maintain the relative positions of the female winding forms 42 and 46 so that their sockets 56 remain horizontally oriented when they are not interengaged with the connecting rods 54 of the male forms 40 and 44.

To better show details, the male winding forms 40 and 44 are shown in FIG. 1 separated from the female forms 42 and 46 and the form supporting parts of the winding form carriages 90 and 92 are shown separated from the winding forms. This condition would not occur in practice. Rather, the winding forms are always supported on the carriages 90 and 92 except when they are locked on the core support extension of a stator.

In operation, with an unwound stator 20 at the form loading station, the winding forms carried by the carriages 90 and 92 are advanced toward one another, as indicated by the arrows 150 and 152 in FIG. 1, until the winding forms 40 and 42 are assembled onto the unwound stator with the coil retaining fingers 28 located within the winding form pockets 50. This position of parts is shown in phantom lines in FIG. 4. Here, it may be noted that an arrow in FIG. 4 indicates movement of the connecting rods 54 of the male winding form 40 toward the female winding form and does not indicate movement of the stator toward the female winding form 46. In practice, the stator is held stationary and the two winding forms 40 and 42 are moved toward one another simultaneously or seriatim to assemble them onto the stator.

During the advancement of the forms 40 and 42 toward one another, the male connecting rods 54 enter the female sockets 56, as also indicated by phantom lines in FIG. 4 and by full lines in FIG. 5. At this time, the clamp rod 60 has been moved to a position wherein it would not interfere with the movements of the connecting rods 54 into and out of the sockets 56. Such movement of the clamp rod 60 occurs whenever the carriage support pin 128 is extended completely into the bores 132 in the female winding form 42 because the support pin 128, upon entry into the bores 132, engages the longer arm 76 of the release lever 72 and thereby pivots the release lever 72 into the position illustrated in FIG. 4 wherein its shorter arm 74 pushes rearwardly on the clamp rod 60, causing the clamp rod 60 to move up the slope of the ovate slots 64, at least substantially out of the path of the connecting rods 54.

Immediately after the winding forms 40 and 42 are assembled onto the stator, the carriages are operated to retract the form support pins 102 and 128 from the winding forms 40 and 42, as indicated by the arrows 154 and 156 in FIG. 1. During such retraction, whatever pressure applied by the carriages to the winding forms holding them against the stator coil support extensions is maintained. Before the support pin 128 is fully retracted from the female winding form 42, the support pin 128 moves out of engagement with the release lever 72, whereupon the bias supplied by the resilient strip 66 pushes the clamp rod 60 into engagement with connecting rods 60, causing it to firmly clamp the connecting rods 54 against the lower surfaces of the sockets 56, as described above, and thereby clamp the male and female winding forms 40 and 42 to one another. The position of parts after retraction of the support pin 128 from the female winding form 42 is illustrated in FIGS. 6 and 7. After the carriages 90 and 92 are fully retracted, the stator coils can be wound. As the coils of wire build up on the coil support extensions 26, any pressure exerted by the coils tending to push the winding forms 40 and 42 apart will be resisted by the clamping action provided by the clamping mechanism 58 described above. This resistance to separation of the winding forms would increase as the pressure on the winding forms increases because any tendency of the connecting rods 54 to move to the left as viewed in FIGS. 6 and 7, would tend, as described above, to increase the pressure which the clamping rod 60 applies to the connecting rods 54.

After the winding of the stator coils, the winding forms 40 and 42 are removed from the stator by manipulation of the carriages 90 and 92. The manner in which entry of the female winding form support pins 128 into the bore 132 pivots the release lever 72 to relieve clamping pressure on the male connecting rods 54 is apparent from the foregoing description.

It will be apparent that the lower winding forms 44 and 46 will be manipulated in the same way as, and simultaneously with, the cooperating upper winding forms 40 and 42.

FIGS. 8 through 12 show a modified winding form assembly including a female winding form, generally designated 200, and a male winding form having connecting rods 54. Parts of the male winding form of FIGS. 8 through 12 are not shown and may be identical to the corresponding parts of the male winding form 40 in the embodiment of FIGS. 1 through 7. (As will be evident to those familiar with the art, the male winding forms of this invention could be entirely conventional because the clamping mechanism is entirely integrated into the female winding form.)

The female winding form 200 of FIGS. 8 through 12 is provided with a modified clamp mechanism which utilizes a clamp member or rod 202, which may be the same as the clamp rod 60, slidably supported by sloping, ovate slots 204 in the body of the winding form 200. Clamp rod 202 is press fit within apertures in the bifurcated end of a release link 206 that has a through bore 208 and is confined within a cavity 210 in the bottom center of the winding form 200 by means of roll pin or dowel 212 pressed in the winding form 200. Clamp rod 202 is biased toward the male winding form and, accordingly, toward the bottoms of the slots 204 by a tension spring 214 having one end hooked around the portion of the clamp rod 202 between the bifurcations of the release link 206 and its other end hooked around a transverse pin 216 located at the forward end of the winding form 200. As should now be evident, the carriage support pin 128, upon entry into the female winding form 200 of FIGS. 8 through 12, will engage within the bore 208 of the link 206, causing it to move rearwardly, to the right as shown in FIG. 9, thereby pulling the clamp rod 202 rearwardly or to the right, causing it to rise upwardly along the ovate slots 204 away from engagement with the connecting rods 54. When the carriage support pin 128 is removed, the spring 214 biases the clamp rod 202 forwardly, to the left as shown in FIG. 11, causing it to firmly grip against the connecting rods 54, thereupon creating the same clamping action provided in the first embodiment. Note in FIGS. 11 and 12 that the bore 208 in the link 206 is slightly misaligned from the bores 220 in the body of the winding form 200 so that part of the link 206 will be in the path of the carriage support pin 128 as it enters the winding form 200, thereby insuring that the link 206 and the clamp rod 202 will be moved to the right to release clamping pressure on the connecting rods 54. Bore 208 preferably has a diameter slightly larger than the diameter of the winding form bores 220 to avoid binding between the link 206 and the support pin 128. The sequence of operations and the results of such operations are the same using the apparatus of FIGS. 8 through 12 as they are using the apparatus of FIGS. 1 through 7.

The embodiment of FIGS. 8 through 12 will often be preferred, especially for use with relatively small winding forms, because the pivotal link 72 of the embodiment of FIGS. 1 through 7 may have insufficient strength to be useful in smaller winding forms. The embodiment of FIGS. 1 through 7 may be preferred for use with larger winding forms, especially if very large clamping pressures are applied. The only mechanical advantage used to slide the link 206 results from the wedging action of the pointed nose of the support pin 128. The use of the lever 72 in the embodiment of FIGS. 1 through 7 multiplies the mechanical advantage so that it is capable of handling greater pressures.

It will be observed in both embodiments that the clamp rods 60 and 202 are located in the front portion of the winding forms (i.e., the portion of the winding forms nearest the stator) and substantial lengths of the connecting rods 54, as shown in FIGS. 7 and 12, extend outwardly past the clamp rods toward the rear of the winding forms. Since it is possible for the clamp rods to frictionally engage and clamp substantially anywhere along the entire lengths of the connecting rods 54, the opposed winding forms of each pair could be spaced apart by substantially different amounts to thereby accommodate stators having different stack heights. In the embodiment of FIGS. 1 through 7, the range of stack heights that can be accommodated is limited by the spacing between the clamp bar 60 and the support pin-receiving bores 132. In the embodiment of FIGS. 8 through 12, the range of stack heights that can be accommodated is limited only by the spacing between the clamp bar 202 and the rearward or distal end of the female winding form 200.

Those familiar with the stator winding art will be aware that aspects of the invention disclosed herein may be used in winding processes in which only one pair of winding forms, or more than two pairs of winding forms, are used.

Although the presently preferred embodiment of this invention has been described, it will be understood that within the purview of the invention various changes may be made within the scope of the following claims.

We claim:

1. In a stator winding apparatus for winding a field coil onto a stator core, said apparatus comprising a winding head assembly that reciprocates and oscillates to draw wire from a source of wire under tension to wind coils and at least one pair of interfitting winding forms located on opposite sides of the stator core for guiding the wire onto said stator core, said pair of winding forms comprising a male winding form having a pair of connecting rods and a female winding form having sockets that slidably receive said connecting rods when the winding forms are assembled together, the improvement wherein a clamp mechanism is integrated into said female winding form, said clamp mechanism comprising a movable clamp member, wherein said female winding form has sloping surfaces that guide said clamp member for movement along an imaginary inclined plane that intersects said sockets and that slopes rearwardly away from the stator core to which the winding forms are to be connected and outwardly from said sockets, said clamp member having a forward end which is engageable with said connecting rods when said winding forms are assembled together, a bias member that biases said clamp member forwardly along said guide surfaces toward said sockets into clamping engagement with said portions of said connecting rods, whereupon any pressures acting to withdraw said connecting rods from said sockets causes said clamp member to be more tightly clamped by wedging action to said connecting rods, and a release member confined within said female winding form actuatable to move said clamp member rearwardly along said inclined plane away from said connecting rods to relieve the clamping pressure on said connecting rods and thereby permit said winding forms to be separated from one another.

2. The improvement of claim 1 wherein said release member comprises a lever pivotally mounted in said female winding form.

3. The improvement of claim 1 wherein said release member comprises a link slidably housed within said female winding form.

4. The improvement of claim 1 further comprising a winding form carriage that moves said female winding form toward and away from a stator to be wound, wherein said female winding form has a bore extending transversely therethrough, and said winding form carriage includes a winding form-support pin slidable in said bore for supporting said female winding form when not supported on a stator, and wherein said release member extends partly into the path of said support pin as it moves into said transverse bore of said female winding form, said release member and said support pin having mutually interchangeable surfaces that cooperate to move said release member thereby to release clamping pressure on said connecting rods.

5. The improvement of claim 4 wherein said release member comprises a lever pivotally mounted in said female wining form and positioned to extend partly across the path of said support pin as it moves into said transverse bore, mutually interchangeable surfaces of said lever and said support pin cooperating to pivot said lever to release clamping pressure on said connecting rods as said support pin is extended through said winding form.

6. The improvement of claim 4 wherein said release member comprises a link slidably housed within said female winding form positioned to extend partly across the path of said support pin as it moves into said transverse bore, mutually interchangeable surfaces of said lever and said support pin cooperating to slide said lever to release clamping pressure on said connecting rods as said support pin is extended through said winding form.

7. The improvement of claim 6 wherein said link is slidable in a direction away from said sockets to release clamping pressure on said connecting rods.

8. The improvement of claim 7 wherein said release link and said bias member are connected to said clamp member.

9. In a stator winding apparatus for winding a field coil onto a stator core, said apparatus comprising a winding head assembly that reciprocates and oscillates to draw wire from a source of wire under tension to wind coils and at least one pair of interfitting winding forms located on opposite sides of the stator core for guiding the wire onto the stator core, said pair of winding forms comprising a male winding form having a pair of connecting rods and a female winding form having sockets that slidably receive said connecting rods when the winding forms are assembled together, the improvement wherein said female winding form has a bore extending transversely therethrough, wherein a pair of winding form carriages move said winding forms toward and away from a stator to be wound, one of said winding forms toward and away from a stator to be wound, one of said winding form carriages including a female winding form-support pin slidable in said transverse bore for supporting said female winding form when not supported on a stator, wherein a clamp mechanism is integrated into said female winding form, said clamp mechanism comprising a movable clamp member, means for guiding said movable clamp member toward and away from the portions of said connecting rods extending into said sockets when said winding forms are assembled onto a stator, means for biasing said clamp member into engagement with said portions of said connecting rods, and movable release means confined within said female winding form for moving said clamp member to relieve the clamping pressure on said connecting rods, said release means extending partly into the path of said support pin as said support pin moves into said transverse bore of said female winding form, said release means and said support pin having mutually interchangeable surfaces that cooperate to move said release means to thereby release clamping pressure on said connecting rods.

10. The improvement of claim 9 wherein said release means comprises a link slidably housed within said female winding form positioned to extend partly across the path of said support pin as it moves into said transverse bore, mutually interengageable surfaces of said link and said support pin cooperating to slide said link in a direction to release clamping pressure on said connecting rods as said support pin is extended through said winding form.

11. The improvement of claim 10 wherein said link is slidable in a direction away from said sockets to release clamping pressure on said connecting rods.

12. The improvement of claim 10 wherein said release link and said bias member are connected to said clamp member.

13. The improvement of claim 9 wherein said release means comprises a lever pivotally mounted in said female winding form and positioned to extend partly across the path of said support pin as it moves into said transverse bore, mutually interengageable surfaces of said lever and said support pin cooperating to pivot said lever to move said clamp member in a direction to release clamping pressure on said connecting rods as said support pin is extended through said winding form.

14. In a stator winding apparatus for winding a field coil onto a stator core, said apparatus comprising a winding head assembly that reciprocates and oscillates to draw wire from a source of wire under tension to wind coils and at least one pair of interfitting winding forms located on opposite sides of the stator core for guiding the wire onto the stator core, said pair of winding forms comprising a male winding form having a pair of connecting rods and a female winding form having sockets that slidably receive said connecting rods when the winding forms are assembled together, said female winding form having a bore extending transversely therethrough, a pair of winding form carriages that move said winding forms toward and away from a stator to be wound, one of said winding form carriages including a female winding form-support pin slidable in said transverse bore for supporting said female winding form when not supported on a stator, the improvement wherein a clamp mechanism is integrated into said female winding form, said clamp mechanism comprising a movable clamp member guided by surfaces of said female winding form for movement along an inclined plane toward and away form the portions of said connecting rods extending into said sockets when said winding forms are assembled onto a stator, a spring member that biases said clamp member into wedge-clamping engagement wit said portions of said connecting rods, and a release member confined within said female winding form for moving said clamp member to relieve the clamping pressure on said connecting rods, said release member partly extending into the path of said support pin as it moves into said transverse bore of said female winding form, said release member and said support pin having mutually interengageable surfaces that cooperate to move said release member thereby to release clamping pressure on said connecting rods.

\* \* \* \* \*